United States Patent
Cepuran et al.

(10) Patent No.: US 9,832,204 B2
(45) Date of Patent: Nov. 28, 2017

(54) METHOD AND SYSTEM FOR MANAGING SECURITY COMPATIBILITY OF ELECTRONIC CONTENT

(71) Applicant: D2L Corporation, Kitchener (CA)

(72) Inventors: Brian Cepuran, Kitchener (CA); Ali Ghassemi, Kitchener (CA); Nicholas Dingle, Kitchener (CA); Jeffrey Geurts, Kitchener (CA); David Lockhart, Kitchener (CA); Matthew Campbell, Kitchener (CA); Jeffrey Avis, Kitchener (CA); David Batiste, Kitchener (CA); Victor Sumner, Kitchener (CA); Rylan Cottrell, Kitchener (CA); Sean Yo, Kitchener (CA); Johnson Hsu, Kitchener (CA); Eric Xu, Kitchener (CA)

(73) Assignee: D2L Corporation, Kitchener, Ontario (CA)

( * ) Notice: Subject to any disclaimer, the term of this patent is extended or adjusted under 35 U.S.C. 154(b) by 0 days.

(21) Appl. No.: 14/490,907

(22) Filed: Sep. 19, 2014

(65) Prior Publication Data

US 2016/0087990 A1 Mar. 24, 2016

(51) Int. Cl.
*H04L 29/06* (2006.01)

(52) U.S. Cl.
CPC ........ *H04L 63/102* (2013.01); *H04L 63/0245* (2013.01)

(58) Field of Classification Search
CPC .......... G06F 17/30873; G06F 2216/15; H04L 67/306; H04L 67/14; H04L 29/06; H04L 69/329; H04L 63/102; H04L 63/0245
See application file for complete search history.

(56) References Cited

U.S. PATENT DOCUMENTS

| 8,584,234 | B1* | 11/2013 | Sobel | H04L 67/2852 |
| | | | | 726/22 |
| 9,166,982 | B1* | 10/2015 | Etesse | |
| 2002/0065912 | A1* | 5/2002 | Catchpole et al. | 709/224 |
| 2005/0240999 | A1* | 10/2005 | Rubin | G06F 21/563 |
| | | | | 726/22 |
| 2005/0260973 | A1* | 11/2005 | van de Groenendaal | H04L 63/102 |
| | | | | 455/411 |
| 2007/0050376 | A1* | 3/2007 | Maida-Smith | G06F 17/3089 |
| 2008/0270890 | A1* | 10/2008 | Stern | G06F 17/30905 |
| | | | | 715/238 |
| 2011/0131275 | A1* | 6/2011 | Maida-Smith et al. | 709/204 |
| 2012/0198513 | A1* | 8/2012 | Maida-Smith et al. | 726/1 |
| 2013/0173782 | A1* | 7/2013 | Ragutski | H04L 63/123 |
| | | | | 709/224 |

(Continued)

*Primary Examiner* — Don Zhao (57) ABSTRACT

There is provided a method and system for managing security compatibility of electronic content. The method includes: receiving electronic content; parsing the electronic content into one or more elements; determining a content security profile of the electronic content; determining an element security profile of the one or more elements of the electronic content; determining whether the element security profile of the one or more elements is compatible with the content security profile; and for each of the one or more elements: if the element security profile is not compatible with the content security profile, modifying the element to have a compatible element security profile, otherwise, not modifying the element.

20 Claims, 6 Drawing Sheets

(56) References Cited

U.S. PATENT DOCUMENTS

| | | | |
|---|---|---|---|
| 2014/0067958 A1* | 3/2014 | Bradley | G06Q 30/0241 709/204 |
| 2014/0129920 A1* | 5/2014 | Sheretov | G06F 17/30873 715/234 |
| 2014/0215573 A1* | 7/2014 | Cepuran | 726/4 |
| 2014/0283069 A1* | 9/2014 | Call | H04L 63/1425 726/23 |
| 2014/0344179 A1* | 11/2014 | Glanville et al. | 705/330 |
| 2014/0351694 A1* | 11/2014 | Verma | G06F 17/274 715/237 |
| 2014/0372846 A1* | 12/2014 | Bouknight, Jr. et al. | 715/205 |
| 2015/0142833 A1* | 5/2015 | McClelland | G09B 5/00 707/755 |
| 2015/0317758 A1* | 11/2015 | Auger | 705/327 |

* cited by examiner

METHOD AND SYSTEM FOR MANAGING SECURITY COMPATIBILITY OF ELECTRONIC CONTENT

FIELD

The present disclosure relates generally to security compatibility in computer networks. More particularly, the present disclosure relates to a method and system for managing security compatibility of electronic content.

BACKGROUND

Electronic content communicated over the Internet and other networks may be considered to have a security profile. The security profile may contain metadata related to a security level, for example, from a high-level of security to non-secure. The security profile would typically provide metadata related to security-related functions, such as to retain confidentiality, integrity, and authentication for the transmitted data, among other goals.

Electronic content is often composed of a number of elements. Like the electronic content, these elements may also have an associated security profile. Further, an element may be, for example, a link to other electronic content with its own security profile. Problems may arise when there is incompatibility between the security profile of the electronic content and the security profile of the elements therein, typically when the electronic content has a high security level while the elements therein have lower security levels, or vice versa. For example, a user may be lead to believe that because the electronic content he is viewing is highly secure, the elements included therein are also secure; when in actuality, at least a portion of the elements may not be secure.

Conventionally, security profile incompatibility between the electronic content and the elements therein may be handled by merely transmitting both the secure and non-secure elements, by only transmitting the secure elements and simply not transmitting any non-secure elements, or lastly, the user may be asked if the user would also like to view the unsecure elements. Each of these options can create problems in terms of security or user experience.

It is, therefore, desirable to provide a method and system for managing security compatibility of electronic content that mitigates at least one disadvantage of previous methods and systems.

The above information is presented as background information only to assist with an understanding of the present disclosure. No determination has been made, and no assertion is made, as to whether any of the above might be applicable as prior art with regard to the present disclosure.

SUMMARY

In a first aspect, the present disclosure provides a method for managing security compatibility of electronic content including: receiving electronic content; parsing the electronic content into one or more elements; determining a content security profile of the electronic content; determining an element security profile of the one or more elements of the electronic content; determining whether the element security profile of the one or more elements is compatible with the content security profile; and for each of the one or more elements: if the element security profile is not compatible with the content security profile, modifying the element to have a compatible element security profile, otherwise, not modifying the element.

In a particular case, determining whether the element security profile of the one or more elements is compatible with the content security profile may include: determining a content security level associated with the electronic content security profile; and determining whether a security level associated with the element security profile of the one or more elements is compatible with the content security level.

In another particular case, determining whether the element security profile of the one or more elements is compatible with the content security profile may include: determining a content delivery protocol associated with the electronic content security profile; and determining whether a delivery protocol associated with the element security profile of the one or more elements is compatible with the content delivery protocol.

In still another particular case, modifying of the element may include modifying an element security level associated with the element security profile.

In yet another particular case, modifying of the element may include: determining whether a functional equivalent element of the element comprising an incompatible security profile is retrievable; and if the functional equivalent element is retrievable, replacing the element with the functional equivalent element. In a particular case, if the functional equivalent element is not retrievable, transmitting a notification of the incompatible element security profile to a user.

In still yet another particular case, if the functional equivalent element is not retrievable, the method may transmit the element with the incompatible element security profile as separate electronic content.

In a particular case, determining whether the functional equivalent element is retrievable may include: modifying a delivery protocol of the element to a delivery protocol that is compatible with the security profile of the electronic content; determining whether the element with a modified delivery protocol is retrievable; and if the element with a modified delivery protocol is retrievable, replacing the element with the functional equivalent element.

In another particular case, retrieving the functional equivalent element may include associating a protocol relative locator with the security profile of the element.

In another aspect, there is provided a system for managing security compatibility of electronic content, the system including: an element determination module configured to receive electronic content and parse the electronic content into one or more elements; a security determination module configured to determine a content security profile of the electronic content and determine an element security profile of the one or more elements of the electronic content; a compatibility determination module configured to determine whether the security profile of the one or more elements is compatible with the security profile of the electronic content; and an element modification module configured to, for each of the one or more elements, modify the element to have an element security profile compatible with the content security profile.

In a particular case, the compatibility determination module may be further configured to: determine a content security level associated with the electronic content security profile; and determine whether a security level associated with the element security profile of the one or more elements is compatible with the content security level.

In another particular case, the compatibility determination module may be further configured to: determine a content delivery protocol associated with the electronic content security profile; and determine whether a delivery protocol associated with the element security profile of the one or more elements is compatible with the content delivery protocol.

In still another particular case, the element modification module may be configured to modify an element security level associated with the security profile.

In yet another particular case, the element modification module may be further configured to: determine whether a functional equivalent element of the element comprising an incompatible security profile is retrievable; and if the functional equivalent element is retrievable, replacing the element with the functional equivalent element.

In still yet another particular case, if the functional equivalent element is not retrievable, the element modification module may be configured to transmit a notification of the incompatible element security profile to a user.

In another particular case, if the functional equivalent element is not retrievable, the element modification module is configured to transmit the element with the incompatible element security profile as separate electronic content.

In still another particular case, the system may further include an element testing module configured to: modify a delivery protocol of the element to a delivery protocol that is compatible with the security profile of the electronic content; determine whether the element with a modified delivery protocol is retrievable; and if the element with the modified delivery protocol is retrievable, replace the element with the functional equivalent element.

In another aspect, there is provided, a method for managing security compatibility of electronic content within a learning management system, the method including: receiving electronic content from the learning management system; parsing the electronic content into one or more elements; determining a content security profile of the electronic content; determining an element security profile of the one or more elements of the electronic content; determining whether the element security profile of the one or more elements is compatible with the content security profile; and for each of the one or more elements: if the element security profile is not compatible with the content security profile, modifying the element to have a compatible element security profile, otherwise, not modifying the element.

In a particular case, the electronic content may include secure educational course content.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

The following description with reference to the accompanying drawings is provided to assist in a comprehensive understanding of example embodiments as defined by the claims and their equivalents. The following description includes various specific details to assist in that understanding but these are to be regarded as merely examples. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding. Accordingly, it should be apparent to those skilled in the art that the following description of embodiments is provided for illustration purpose only and not for the purpose of limiting the invention as defined by the appended claims and their equivalents.

Generally, the present disclosure provides a method and system for managing security compatibility of electronic content. In particular, the embodiments of the system and method detailed herein provide for one or more elements of the electronic content to be modified if the security profile associated with the one or more elements is incompatible with the security profile associated with the electronic content. Further, the system and method are intended to provide for the elements that are associated with incompatible security profiles when compared to the security profile of the electronic content to be modified, if certain conditions apply as detailed herein.

Figure 1:
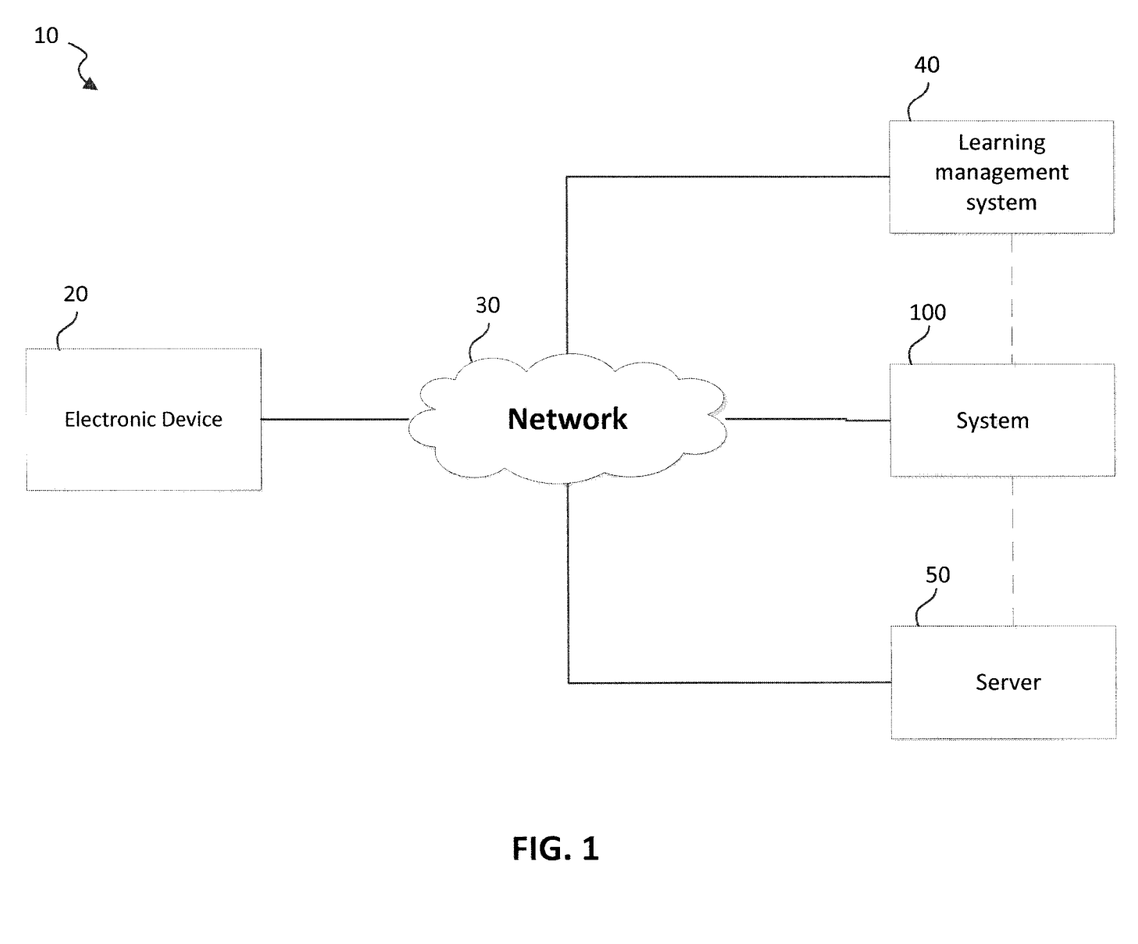
FIG. 1 illustrates an example environment for a system for managing security compatibility of electronic content.

FIG. 1 is an example environment 10 for a system 100 for security compatibility of electronic content, according to an embodiment. An electronic device 20, for example, a computer, a tablet, a smartphone, an e-book, a gaming machine, a network enabled television, or the like, transmits and receives electronic content via a network 30. The electronic content may be any assemblage of electronic data, such as, a web-page, an e-mail, an application, a game, a file, and the like. The network 30 may be, for example, the Internet, an intranet, a local area network (LAN), a wide area network (WAN), a personal area network (PAN), a virtual local area network (VPN), a mobile network and a telecommunications network. Through the network 30, the electronic device 20 may connect to a network device to communicate the electronic content. The network device may be, for, example, a server 50, a learning management system 40, or the like. The system 100 may be a separate server or other network device operatively connected to various other network devices, such as the server 50 or the learning management system 40, or may be a component or module of a network device.

Figure 2:
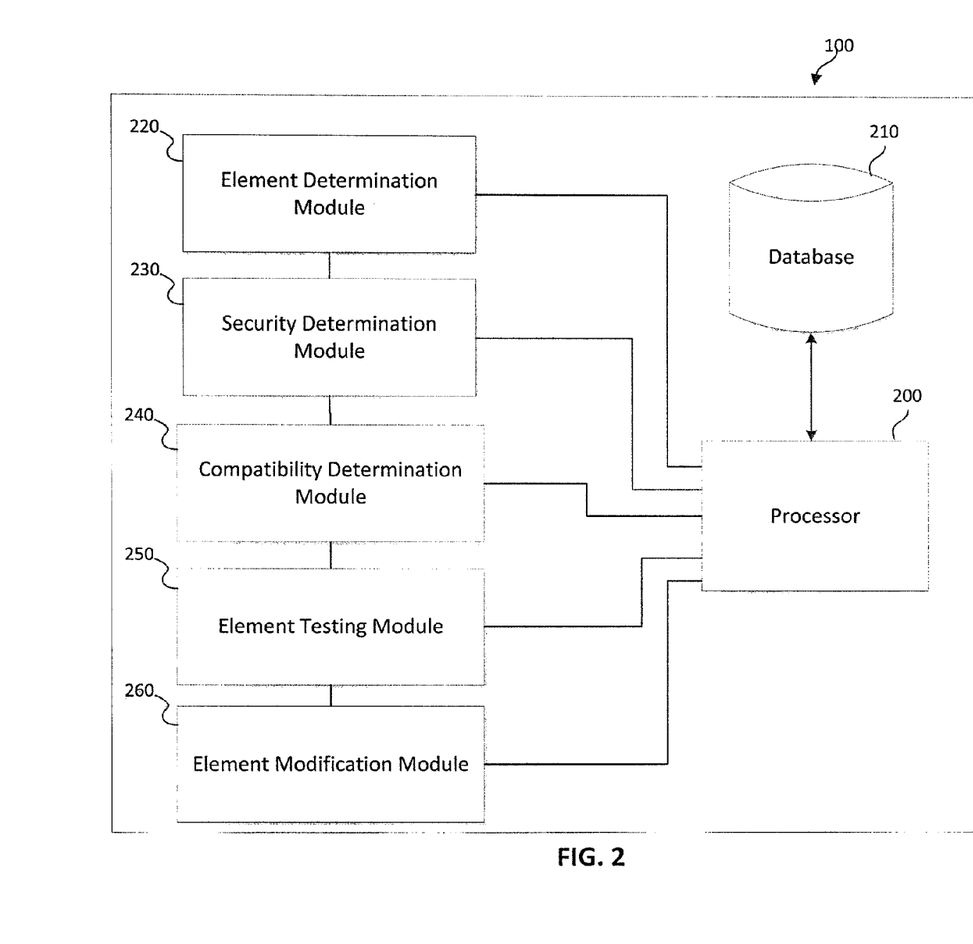
FIG. 2 illustrates a system for managing security compatibility of electronic content according to an embodiment.

FIG. 2 illustrates an embodiment of the system 100. The system 100 includes a processor 200, a database 210, an element determination module 220, a security determination module 230, a compatibility determination module 240, an element testing module 250 and element modification module 260.

The system 100 includes at least one processor 200, configured to execute the instructions of the other modules. In some cases, each module may include a processor. In other cases, the system 100 may be a component within a server 50 or other network device, and the processor 200 may be a central processing unit for the server 50 or other network device.

In an embodiment, the processor 200 may be configured to interact with the database 210. The database 210 can be stored on any electronic storage medium known in the art. In some cases, the database 210 may be a component of or operatively connected to one of the modules. In other cases, the database 210 may be an operable combination of two or more databases. The database 210 may be automatically managed, managed by one or more users, managed by one or more administrators, or the like.

The electronic content received from the network 30 is processed by the element determination module 220. In a particular case, the system 100 receives the electronic content by intercepting the electronic content as the content travels between the electronic device 20 and the network device, such as, for example, the server 50, the learning management system 40, or the like. The element determination module 220 analyzes the electronic content to determine any elements associated with the electronic content. The electronic content may have one or more elements therein. For example, if the electronic content is a web-page, the elements of the web-page may be the frames, inline-frames (iframes), links, forms, images, embedded objects, scripts, applets, style sheets, embedded video, embedded audio, embedded presentations, and the like.

The security determination module 230 determines a content security profile associated with the electronic content and an element security profile for each of the elements associated with the electronic content. The security profile details a security level of the electronic content and associated elements. In an example, if the electronic content is an email, the security profile may include metadata related to an authentication process that must be completed to decrypt the email or render the email in a readable format. In a further example, the security profile may include metadata related to a security level associated with the electronic content or associated elements, for example a high security level or an non-secure security level. The security profile may further include metadata related to a transmission security, for example a delivery protocol or application layer protocol such as, for example, hypertext transfer protocol secure (HTTPS), secure sockets layer (SSL), transport layer security (TLS), secure shell (SSH), or the like. The delivery protocol can also be a type of mail protocol such as secure/multipurpose internet mail extensions (S/MIME). As well, the delivery protocol can be a type of internet protocol (IP) such as the internet protocol security (IPSec) suite of protocols, or the like.

In some cases, the security determination module 230 may determine the security profile data by parsing the metadata associated with the content and the metadata associated with each of the one or more elements. In an example, the security determination module 230 may determine the delivery protocol by parsing the locator associated with the electronic content and each of the elements; such as parsing the uniform resource locator (URL) for an HTTPS uniform resource identifier (URI) scheme (a URI scheme is also referred to as a 'protocol prefix').

The compatibility determination module 240 performs a comparison of each element security profile with the security profile of the electronic content. Based on the comparison, the compatibility determination module 240 will make a determination about whether each element's security profile is compatible with the electronic content's security profile. In some cases, the comparison includes a determination that at least one of the elements' security profiles is not compatible if the element's security profile includes a security level of "non-secure" and the electronic content's security profile includes a security level of "secure". The security level may be determined be retrieving, for example, the delivery protocol, an associated authentication process, or other metadata associated with the security profile.

In some cases, the compatibility determination module 240 may make a determination of not compatible if the security profile of one of the elements is secure and the security profile of the electronic content is secure, but the security level of the security profile of the electronic content is of a higher level security than the security profile of the element. For example, one of the elements may be not compatible with the electronic content if the element's security profile indicates that the element is associated with SSL version 2 while the electronic content's security profile indicates that the electronic content is associated with SSL version 3.

Where there is a determination that the element security profile of at least one of the elements is not compatible with the content security profile of the electronic content, the element may be reviewed or tested by the element testing module 250. In some cases, the element testing module 250 may perform a test to determine whether there is a retrievable element that functions the same as the incompatible element (i.e., a functional equivalent) but has an element security profile that is compatible with the security profile of the electronic content. If the functional equivalent is retrievable, the element modification module 260 modifies the element by substituting the original element with the functional equivalent element such that the element security profile of the functional equivalent element will be compatible with the content security profile.

In other cases, the element testing module 250 may test the incompatible element by modifying the metadata associated with security profile of the element, for example modifying a delivery protocol of the element. The element testing module 250 may attempt to retrieve the modified element, and determine if a functional response is returned. For example, if the electronic content is a secure web-page with an HTTPS URI scheme and the element is embedded with an HTTP URI scheme, the element testing module 250 may change the URI scheme of the element to HTTPS and send out a test request. If the response status code is positive, for example a '200' response or the like, then they system determines that the element will likely function with an HTTPS URI scheme, and the element modification module 260 modifies the element accordingly by modifying the URI scheme. If the response status code is negative, for example a '404' response, an error code, or the like, then the element may not function with an HTTPS URI scheme and the element modification module 260 will not modify the URI scheme of the element.

In still other cases, the element testing module 250 may use the database 210 to test whether the incompatible element has a functional equivalent that is retrievable and has a security profile that is compatible with the security profile of the electronic content. The database 210 may store identifying data for elements that have a retrievable and functional equivalent counterpart with a different security levels associated with the security profile. The identifying data may include, for example, a URL, internet protocol (IP) address, media access control (MAC) address, title, metadata, tags, structural information, and the like. The element testing module 250 may determine identifying data of the element and compare the identifying data of the element with identifying data in the database; and if there is a match, retrieve the identifying data from the database 210. The identifying data from the database may correspond to a functional equivalent element or a security profile of a functional equivalent element, which is intended to have a compatible security profile with the content security profile. The element modification module 260 modifies the original element by substituting the original element with the functional equivalent element retrieved from the database or by substituting the security profile of the functional equivalent and compatible element for the security profile of the original element. It is intended that the security profile of the element will then be compatible with the security profile of the electronic content.

In an example, the electronic content may be a secure web-page with an embedded streaming video, such as a YouTube™ video. The element testing module 250 may search the database 210 for corresponding URL identifying data ("http://www.youtube.com/watch?v=3PUPwgqceMY"). Upon locating substantially similar URL identifying data in the database 210, the element testing module 250 retrieves the functional equivalent URL identifying data for the root website ("https://www.youtube.com/"). The element modification module 260 modifies the element by substituting the URL of the element with the secure functional equivalent ("https://vvwvv.youtube.com/watch?v=3PUPwgqceMY").

In a further example, the element modification module 260 will modify the element by substituting the URL of the element with a protocol relative URL. A protocol relative URL is similar to a standard URL except that that the URI scheme is left out. Without the URI scheme, the element will be retrieved using the same type of security protocol as the security profile associated with the electronic content. Therefore, in the previous example, the element modification module 260 will modify the element by substituting the protocol relative URL ("//www.youtube.com/watch?v=3PUPwgqceMY"). In this example, if the element testing module 250 determined that there was not a secure functional equivalent, then the element modification module 260 does not modify the security profile of the element.

In another embodiment, the element testing module 250 may use the database 210 to test or determine whether the incompatible element has a functional equivalent, as described above. However, if the element testing module 250 does not locate a substantial match, the element testing module 250 may test the element by modifying the element, attempting to retrieve the element, and determining if a functional response is returned, as previously described. If the test reveals that the element has a functional equivalent compatible with the security profile of the electronic content, the element modification module 260 modifies the element, for example by modifying the element's security profile, and the identifying data for the functional equivalent may be inserted into the database 210 by the element testing module 250. The element testing module 250 is intended to increase efficiency of the system 100 by only testing responses of elements that do not match identifying data in the database 210.

In a further case, the database 210 can be used to store elements which were tested and found not to have a functional equivalent. Thus, subsequent determinations by the element testing module 250 of the same element will not require unnecessary testing for a functional equivalent. In some cases, the element testing module 250 can periodically retest elements that were found to not have a functional equivalent to check if a functional equivalent has become available. The period for re-testing may be set at any appropriate time period, such as one hour, one day, one week, one month, or the like.

The database 210 may also be managed by users, administrators, or the like, such that the users can add or remove data from the database 210 as required. In some cases, the data in the database 210 may be shared with other databases (not shown) in order to provide a more comprehensive set of data. The collection of databases may also have their data mined by the element testing module 250 to determine whether there are elements that are generally common and have a functional equivalent. In other cases, the database 210 can be combined or merged with a database of blacklisted elements; where blacklisted elements are ones that are blocked or limited by a user or administrator due to reasons of, for example, security, compatibility, spam, irrelevance, procrastination, or the like.

When a functional equivalent cannot be retrieved by the element testing module 250, such as when the element testing module 250 does not locate a substantial match in the database 210 or when testing of the element does not return a functional equivalent, the element modification module 260 may modify the element to be retrieved separately from the electronic content. For example, if the electronic content is a web-page and the element is an embedded video, the embedded video can be retrieved in a separate tab or window from that of the associated web-page. In another example, when a functional equivalent cannot be retrieved by the element testing module 250, the element modification module 260 may modify the element to be retrieved with a message, such as a warning message that the security profile of the element is not compatibility with the security profile of the electronic content. In still another case, when a functional equivalent cannot be retrieved by the element testing module 250, the element modification module 260 will not retrieve the element.

Figure 3:
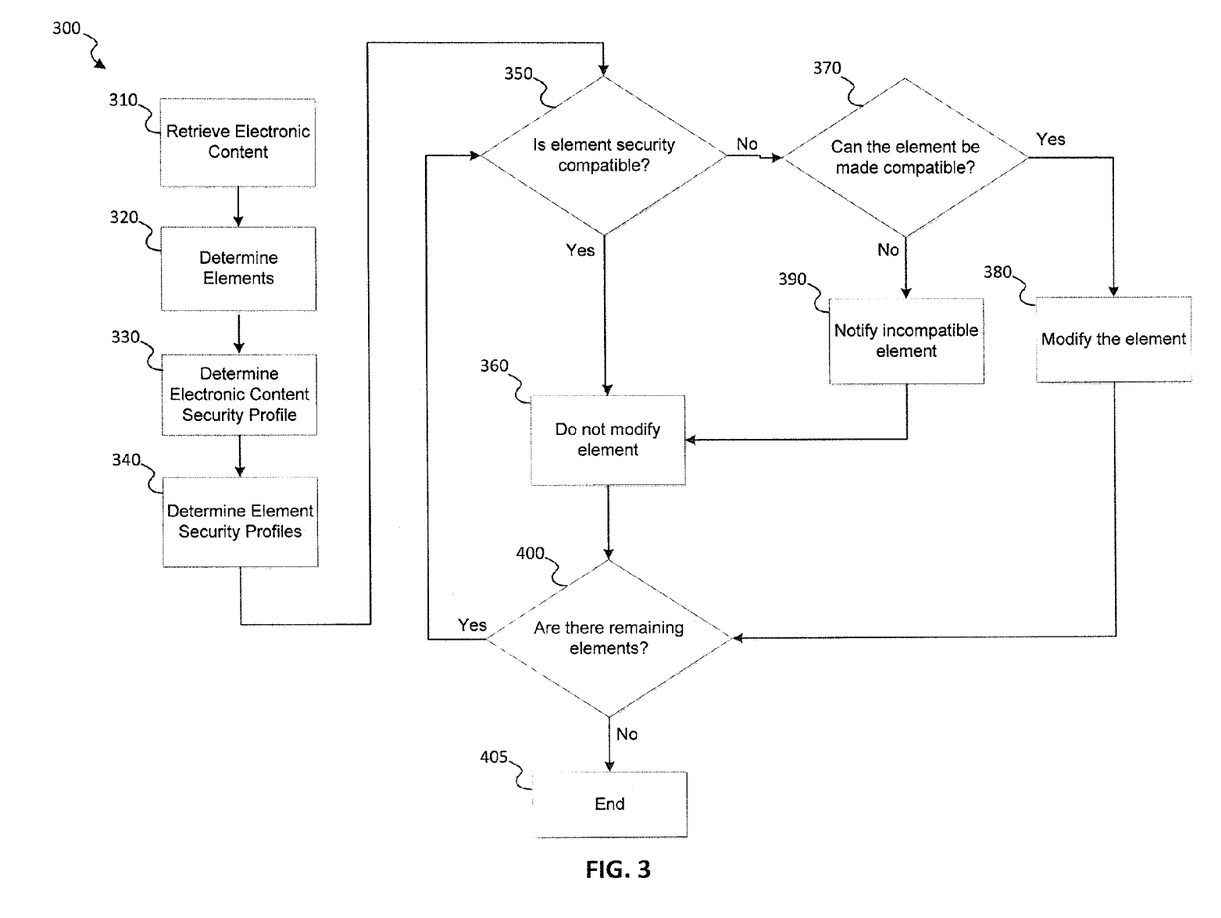
FIG. 3 is a flowchart illustrating a method for managing security compatibility of electronic content according to an embodiment.

FIG. 3 is a flowchart illustrating a method 300 for managing security compatibility of electronic content according to an embodiment.

At 310, electronic content is retrieved from the network 30. In a particular case, the system 100 retrieves the electronic content by intercepting the electronic content as the content travels between the electronic device 20 and the network device, such as, for example, the server 50, the learning management system 40, or the like.

At 320, the electronic content is processed by the element determination module 220 and the electronic content is inspected to determine one or more of the elements associated with or embedded in the electronic content.

At 330, the content security profile of the electronic content is determined by the security determination module 230.

At 340, the element security profiles of one or more of the elements are determined by the security determination module 230. It will be understood that the element security profiles may be determined in parallel with the content security profile or even prior to the content security profile depending on the processing capabilities of the system 100.

At 350, the compatibility determination module 240 determines the compatibility of the security profile of one of the elements with the security profile of the electronic content. At 360, the element will not be modified if the security profile of the element is compatible with the security profile of the electronic content.

At 370, if the security profile of the element is not compatible with the security profile of the electronic content, the element modification module 260 in communication with the element testing module 250 determines whether the security profile of the element can be made compatible.

If the security profile of the element can be made compatible, at 380, the element modification module 260 modifies the element to make the security profile of the element compatible or may replace the element with a functional equivalent element having a compatible security profile.

At 390, if the security profile of the element cannot be made compatible, the element modification module 260 provides notification that the security profile is not compatible, for example, by providing a notification to be transmitted to the user requesting the content, or the like. At 360, the element is not modified.

At 400, the system 100 determines whether there are remaining elements security profiles to be compared to determine compatibility with the security profile of the electronic content. If there are remaining elements, the determination as to whether the security profile is compatible is repeated; and if not, the method will end, at 405.

Figure 4:
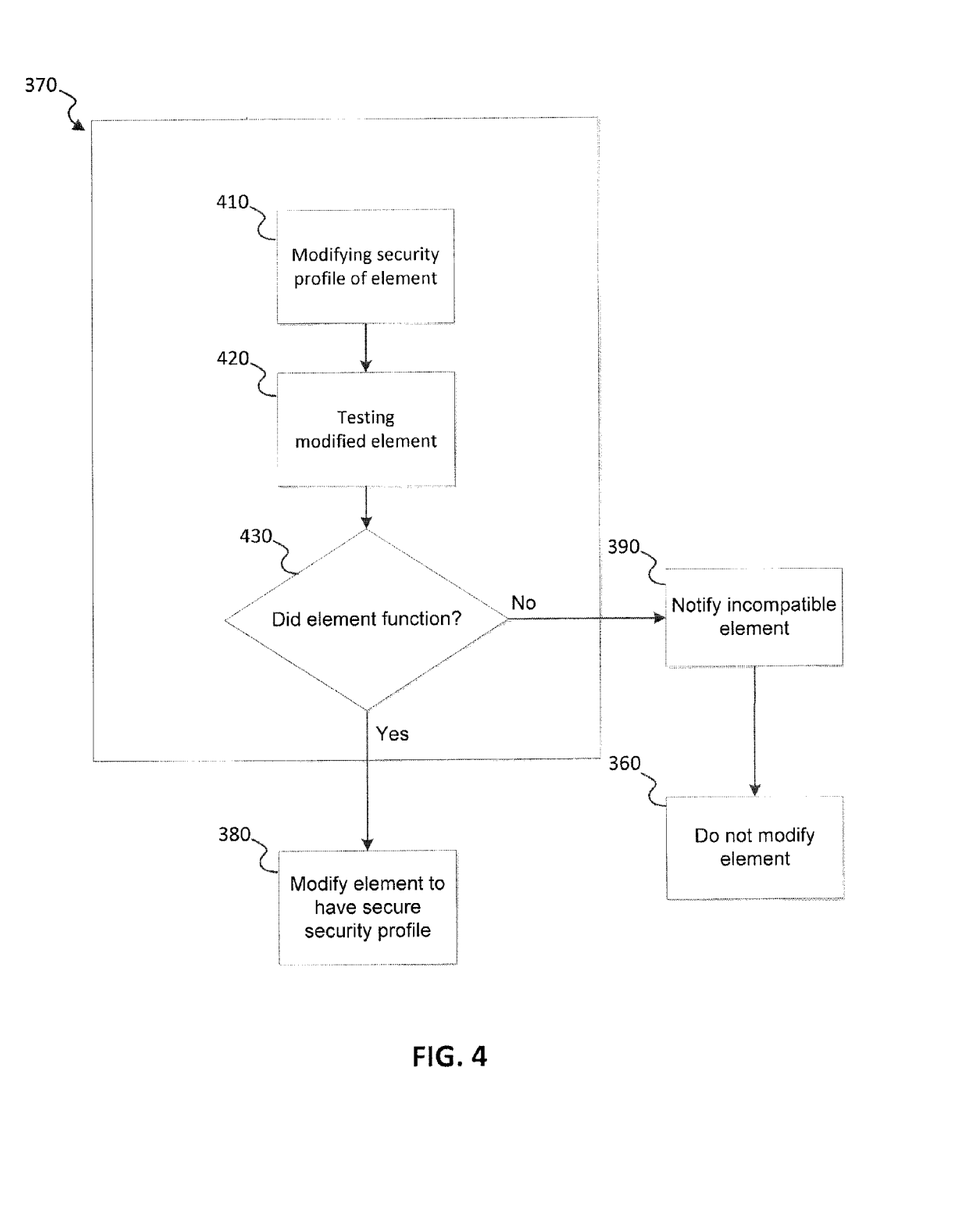
FIG. 4 is a flowchart illustrating a method for modifying an element, according to an embodiment.

In some embodiments, modifying the element may further, or alternatively, follow the method illustrated in the flowchart of FIG. 4. At 410, the element testing module 250 may modify the security profile by, for example, changing metadata within the security profile, for example, the delivery protocol of the element.

At 420, the element testing module 250 performs a test of attempting to retrieve the element with the modified security profile. At 430, the element testing module 250 determines whether the retrieval attempt generated a positive response. If the response was positive, for example a '200' response or the like, then the modified element will likely function with the modified security profile, or the modified element may replace the incompatible element. If the response status code is negative, for example a '404' response, an error code, or the like, then the incompatible element will likely not function with the modified security profile.

At 390, if the element testing module 250 determined that there was not a functional response, then the element modification module 260 notifies the user requesting the electronic content of the incompatible element and, at 360, does not modify the security profile of the element. At 380, if the element testing module 250 determined that there was a functional response, the element modification module 260 modifies the element to have a compatible security profile, or in some cases, may replace the element with a functional equivalent element.

Figure 5:
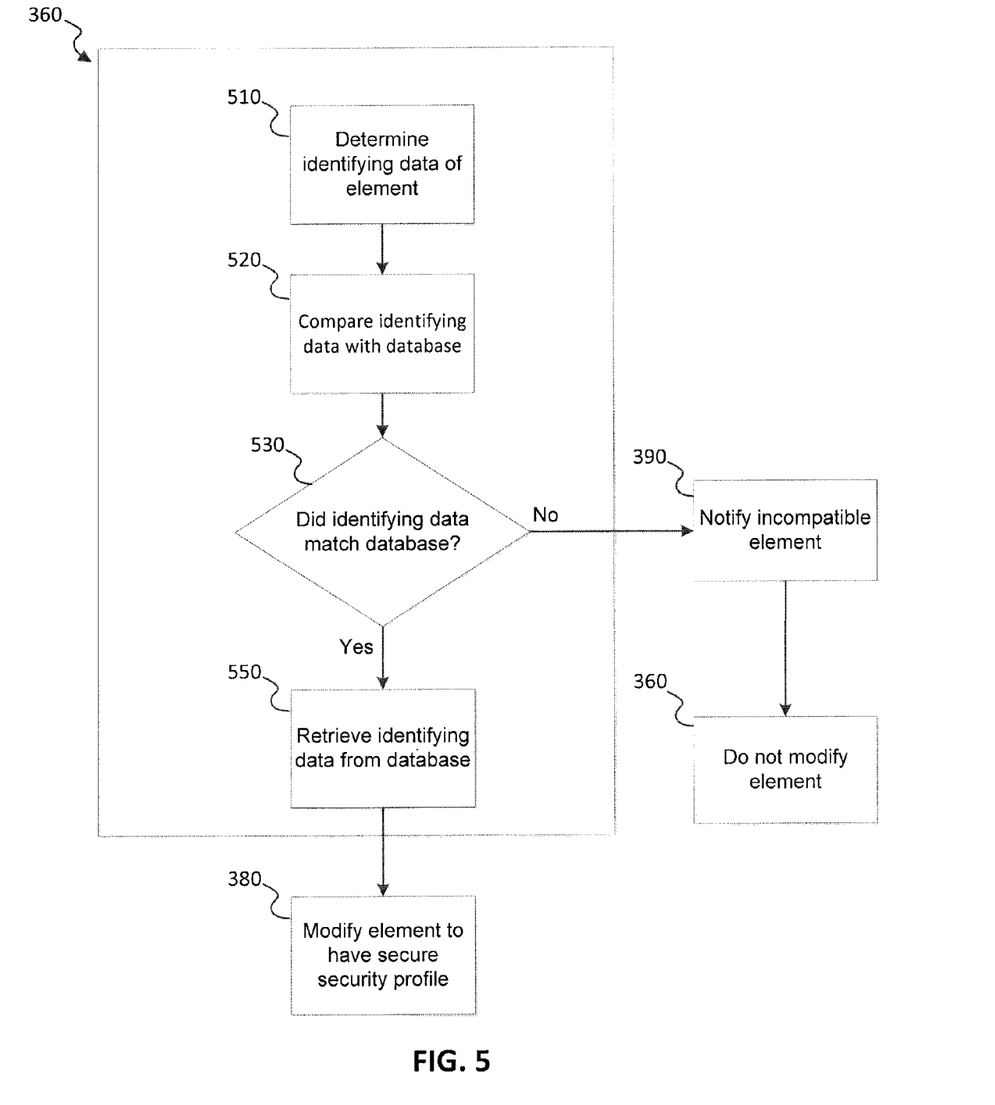
FIG. 5 is a flowchart illustrating a method for modifying an element, according to another embodiment.

In some embodiments, modifying the element may further, or alternatively, follow the method illustrated in the flowchart of FIG. 5. At 510, the element testing module 250 identifies the identifying data of the element. The identifying data may comprise a URL, internet protocol (IP) address, media access control (MAC) address, title, metadata, tags, structural information, or the like and may be including as part of the security profile of the element or may otherwise be associated with the element.

At 520, the element testing module 250 compares the identifying data of the element with previously stored identifying data of various elements stored in the database 210. At 530, the element testing module 250 determines whether the identifying data of the element matches, or is otherwise associated with, identifying data stored in the database 210. The identifying data in the database may correspond to a functional equivalent element but having a security profile compatible with the security profile of the electronic content.

If there is no match, at 390, the element modification module 260 notifies of the incompatible element and, at 360, does not modify the security profile of the element.

If there is a match, at 550 the element testing module 250 will retrieve the identifying data of the substantial match from the database 210. At 380, the element modification module 260 will modify the element by using the retrieved identifying data from the database 210 representing a functional equivalent of the element, either by modifying the security profile of the element or by substituting the element with a functional equivalent element having a compatible security profile. By substituting the functional equivalent, it is intended that the security profile of the element will be compatible with the security profile of the electronic content.

In a further embodiment, the methods illustrated in FIGS. 4 and 5 can be combined. For example, if the element testing module 250 does not determine a match at 530 of FIG. 5, then the element testing module 250 may perform the method of FIG. 4 for testing the element. At 450, if the element testing module 250 determines that there is a functional equivalent element, the element modification module 260 modifies the element to have a secure security profile as tested. Additionally, the element testing module 250 may add identifying data of the functional equivalent element into the database 210. Thus, future operation of the element testing module 250 is intended to have increased efficiency by only having to test elements that do not substantially match identifying data in the database 210.

The system and method described herein are intended to provide certain advantages. For example, some web browsers, such as Google™ Chrome™ and Mozilla™ Firefox™ when handling a web-page with mixed content of both secure and insecure elements, may automatically block the insecure elements. This blocking may have functionality implications for a user of the electronic device 20 as the insecure elements may not work on a secure web-page. As well, some web browsers, such as Microsoft™ Internet Explorer™, may provide a warning of the insecure elements but still retrieve both the secure and insecure elements. This option may present security concerns with regard to a user having to use his/her discretion when providing and receiving information from a site that is not completely secure. The system and method is intended to provide functional equivalent elements without unduly burdening a user of the electronic device 20 with having to make discretionary, and possibly harmful, security choices.

Figure 6:
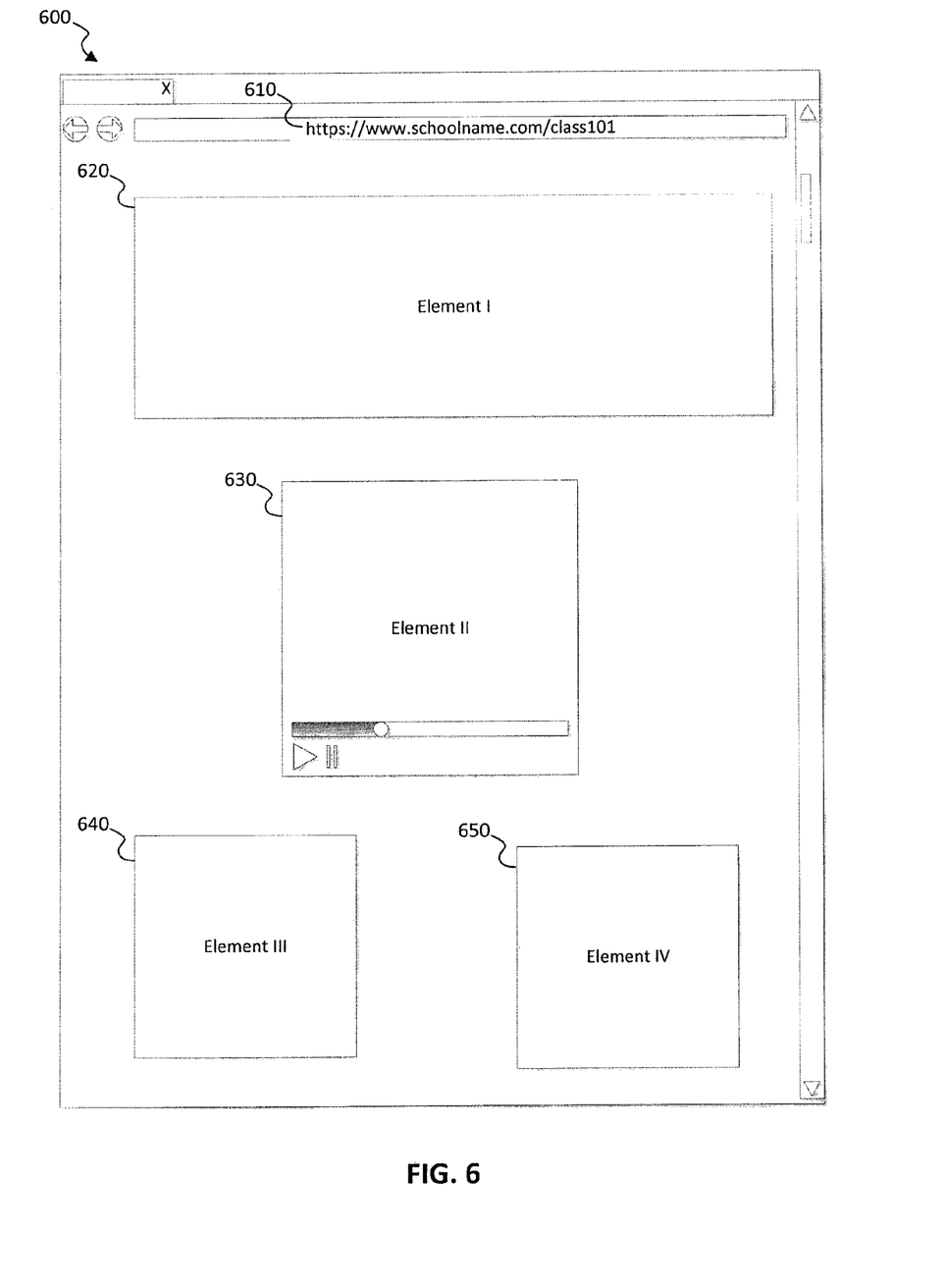
FIG. 6 illustrates an example electronic content with associated elements according to an example embodiment.

FIG. 6 illustrates an example of electronic content including at least one element. In this example, a teacher may create a web-page 600 for his/her class on a learning management system 40 accessible on an intranet of an educational institution. The web-page may be designed as a secure web-page in that the security profile includes metadata associated with a high level of security and the web-page is further indexed with a secure URL 610. The high level of security is intended to ensure only the enrolled students have access to the content of the web-page. As part of the web-page, the teacher includes four elements 620, 630, 640 and 650. One of the elements, Element II 630, is an embedded video from a video-streaming website, such as YouTube™, in an iframe. Further, the system 100 determines that the embedded video element does not have a compatible security profile, for example the embedded video element may have a URL (not shown) that is not secure, such as having a URI scheme of "http://" rather than the secure "https://".

If a secure equivalent of the video is retrievable, the system 100 may substitute the insecure embedded video, with the "http://" URI scheme, with the secure "https://" URI scheme, or may modify the security profile of the embedded video in a manner that would modify the URI scheme of the embedded video element. This modification is intended to ensure that a student's access to the embedded video will remain functional and be compatible with the security requirements of the web-page.

In a further example, the system 100 may substitute the embedded video element, with the "http://" URI scheme, with a functional equivalent element having a protocol relative URL, or may modify the security profile of the embedded video element to include a protocol relative URL as the delivery protocol. A protocol relative URL may allow the web-page to later be changed to insecure and still have the embedded content function properly.

In a further example, the system 100 may notify the teacher with a warning message if an element having a compatible security profile is not retrievable. If a functional equivalent element with a compatible security profile is not retrievable, the system 100 may also periodically retest the element periodically to check if the functional equivalent embedded video has become retrievable and modify the URI scheme of the security profile of the embedded video when a retrievable function equivalent element is found.

In yet another example, if a function equivalent element with a compatible security profile is not retrievable, the system 100 may open the video in a new tab or window of a web browser. When the element is opened in a new tab or window, the electronic content may be determined as the same as the element, thus the security profiles will be compatible. The system 100 may also warn the teacher or student that the element is being opened in a new tab or window and may further provide notification regarding the security level of the new tab or window, for example, that the teacher or student is no longer viewing a web-page with a high security level.

In the preceding description, for purposes of explanation, numerous details are set forth in order to provide a thorough understanding of the embodiments. However, it will be apparent to one skilled in the art that these specific details may not be required. In other instances, well-known structures are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for managing security compatibility of electronic content, the method comprising:
   receiving a request for electronic content to be provided over a network;
   parsing the electronic content into one or more elements;
   determining a content security profile of the electronic content;
   determining one or more element security profiles corresponding to the one or more elements of the electronic content;
   determining whether the one or more element security profiles of the one or more elements are compatible with the content security profile;
   for each of the one or more elements:
   if a corresponding one or more element security profiles of the each element are not compatible with the content security profile, modifying the each element to have a compatible element security profile, wherein the modifying of the each element to have the compatible element security profile comprises substituting the each element with a functionally equivalent element that has a corresponding element security profile that is compatible with the content security profile,
   otherwise, not modifying the element; and
   providing electronic content to a client device over the network, wherein in response to at least one of the one or more elements being modified, the electronic content provided to the client device over the network includes the at least modified one or more elements.

2. The method of claim 1, wherein the determining whether the one or more element security profile of the one or more elements is compatible with the content security profile comprises:
   determining a content security level associated with the electronic content security profiles; and
   determining whether a security level associated with the corresponding one of the one or more element security profiles corresponding to the one or more elements is compatible with the content security level.

3. The method of claim 1, wherein the determining whether the element security profile corresponding to the one or more elements is compatible with the content security profile comprises:
   determining a content delivery protocol associated with the electronic content security profile; and
   determining whether a delivery protocol associated with the element security profile of the one or more elements is compatible with the content delivery protocol.

4. The method of claim 1, wherein the modifying of the element comprises modifying an element security level associated with the element security profile.

5. The method of claim 1, wherein the modifying of the element comprises:
   determining whether a functional equivalent element of the element comprising an incompatible security profile is retrievable; and
   if the functional equivalent element is retrievable, replacing the element with the functional equivalent element.

6. The method of claim 5, wherein if the functional equivalent element is not retrievable, transmitting a notification of the incompatible element security profile to a user.

7. The method of claim 5, wherein if the functional equivalent element is not retrievable, transmitting the element with the incompatible element security profile as separate electronic content.

8. The method of claim 5, wherein determining whether the functional equivalent element is retrievable comprises:
modifying a delivery protocol of the element to a delivery protocol that is compatible with the security profile of the electronic content;
determining whether the element with a modified delivery protocol is retrievable; and
if the element with a modified delivery protocol is retrievable, replacing the element with the functional equivalent element.

9. The method of claim 5, wherein retrieving the functional equivalent element comprises associating a protocol relative locator with the security profile of the element.

10. A system for managing security compatibility of electronic content, the system comprising a storage device and a processor configured to:
receive a request for electronic content to be provided over a network;
parse the electronic content into one or more elements;
determine a content security profile of the electronic content;
determine one or more element security profiles corresponding to the one or more elements of the electronic content;
determine whether the one or more element security profiles of the one or more elements are compatible with the content security profile;
for each of the one or more elements:
if a corresponding one or more element security profiles of the each element are not compatible with the content security profile, modify the each element to have a compatible element security profile, wherein the modifying of the each element to have a compatible element security profile comprises substituting the each element with a functionally equivalent element that has a corresponding element security profile that is compatible with the content security profile,
otherwise, not modifying the element; and
provide electronic content to a client device over the network, wherein in response to at least one of the one or more elements being modified, the electronic content provided to the client device over the network includes the at least modified one or more elements.

11. The system of claim 10, wherein the processor is further configured to:
determine a content security level associated with the electronic content security profile; and
determine whether a security level associated with the corresponding one of the one or more element security profiles corresponding to the one or more elements is compatible with the content security level.

12. The system of claim 10, wherein the processor is further configured to:
determine a content delivery protocol associated with the electronic content security profile; and
determine whether a delivery protocol associated with the element security profile of the one or more elements is compatible with the content delivery protocol.

13. The system of claim 10, wherein the processor is configured to modify an element security level associated with the security profile.

14. The system of claim 10, wherein the processor is further configured to:
determine whether a functional equivalent element of the element comprising an incompatible security profile is retrievable; and
if the functional equivalent element is retrievable, replacing the element with the functional equivalent element.

15. The system of claim 14, wherein if the functional equivalent element is not retrievable, the element modification module is configured to transmit a notification of the incompatible element security profile to a user.

16. The system of claim 14, wherein if the functional equivalent element is not retrievable, the element modification module is configured to transmit the element with the incompatible element security profile as separate electronic content.

17. The system of claim 14, wherein the processor is further configured to:
modify a delivery protocol of the element to a delivery protocol that is compatible with the security profile of the electronic content;
determine whether the element with a modified delivery protocol is retrievable; and
if the element with the modified delivery protocol is retrievable, replace the element with the functional equivalent element.

18. A method for managing security compatibility of electronic content within a learning management system, the method comprising:
receiving a request for electronic content from the learning management system to be provided over a network;
parsing the electronic content into one or more elements;
determining a content security profile of the electronic content;
determining one or more element security profiles corresponding to the one or more elements of the electronic content;
determining whether the one or more element security profiles of the one or more elements are compatible with the content security profile;
for each of the one or more elements:
if a corresponding one or more element security profiles of the each element are not compatible with the content security profile, modifying the each element to have a compatible element security profile, wherein the modifying of the each element to have a compatible element security profile comprises substituting the each element with a functionally equivalent element that has a corresponding element security profile that is compatible with the content security profile,
otherwise, not modifying the element; and
providing electronic content to a client device over the network, wherein in response to at least one of the one or more elements being modified, the electronic content provided to the client device over the network includes the at least modified one or more elements.

19. The method of claim 18 wherein the electronic content has secure educational course content.

20. The method of claim 1, wherein the security profile includes information indicating a transmission protocol or format to be used.

* * * * *